(12) United States Patent
Weis (10) Patent No.: US 10,122,260 B2
(45) Date of Patent: Nov. 6, 2018

(54) SWITCHED-MODE POWER CONVERTER WITH A CURRENT LIMIT CIRCUIT

(71) Applicant: Dialog Semiconductor (UK) Limited, London (GB)

(72) Inventor: Marcus Weis, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/137,097

(22) Filed: Apr. 25, 2016

(65) Prior Publication Data
US 2017/0098992 A1 Apr. 6, 2017

(30) Foreign Application Priority Data
Oct. 6, 2015 (DE) .................... 10 2015 219 307

(51) Int. Cl.
*H02M 1/32* (2007.01)
*H02M 3/156* (2006.01)
*H02M 1/08* (2006.01)

(52) U.S. Cl.
CPC .............. *H02M 1/32* (2013.01); *H02M 1/08* (2013.01); *H02M 3/156* (2013.01)

(58) Field of Classification Search
CPC .......... H02M 1/32; H02M 1/08; H02M 3/156; H02M 3/158; H02M 2001/0009; H02M 2001/0016; H02M 2001/0019; H02M 2001/0022; H02M 1/14; H02M 2003/1566; H02J 7/045; H02J 7/0072; H02J 2007/0059; H02J 2007/10; G05F 1/56; G05F 1/565
See application file for complete search history.

(56) References Cited

U.S. PATENT DOCUMENTS

| 9,325,194 | B2 * | 4/2016 | Zou ........................ H02J 7/022 |
| 2002/0001209 | A1 * | 1/2002 | Moriguchi ......... H05B 41/2925 363/97 |
| 2009/0128112 | A1 * | 5/2009 | Xu ........................ H02M 3/156 323/282 |

(Continued)

OTHER PUBLICATIONS

German Office Action and English Translation 10 2015 219 307.1, dated Apr. 13, 2016, Dialog Semiconductor (UK) Limited.

(Continued)

*Primary Examiner* — Gustavo Rosario Benitez
(74) *Attorney, Agent, or Firm* — Saile Ackerman LLC; Stephen B. Ackerman (57) ABSTRACT

A switched-mode power converter with current limit circuits for limiting the input current into the power converter and/or the output current is presented. The power converter contains a feedback loop for controlling the output voltage of the converter. A first voltage comparison unit within the feedback loop compares an output voltage with a reference voltage and outputs an error voltage based on the comparison. The power converter also contains a current control unit for limiting the input/output current. The current control unit contains a current comparison unit and a connection unit. The current comparison unit compares the input/output current with a current threshold and outputs an intermediate voltage based on the comparison. The connection unit connects the output of the current comparison unit and the output of the current comparison unit to the output of the first voltage comparison unit if the input/output current exceeds the current threshold.

18 Claims, 4 Drawing Sheets

(56) References Cited

U.S. PATENT DOCUMENTS

| | | | | |
|---|---|---|---|---|
| 2010/0253307 A1* | 10/2010 | Chen | ................... | H02M 1/4225 323/283 |
| 2011/0095732 A1* | 4/2011 | Park | ......................... | G05F 1/70 323/207 |
| 2011/0121801 A1* | 5/2011 | Scaldaferri | ........... | H02M 3/156 323/276 |
| 2011/0122664 A1* | 5/2011 | Yabuzaki | ................ | H02M 1/32 363/53 |
| 2011/0140630 A1* | 6/2011 | Doudousakis | ........ | H02M 3/156 315/291 |
| 2012/0176113 A1* | 7/2012 | Grant | ................... | H02M 3/156 323/285 |
| 2013/0147277 A1* | 6/2013 | Popescu-Stanesti | ........................ | H02J 7/0068 307/66 |
| 2014/0117964 A1* | 5/2014 | Walters | .............. | H05B 33/0815 323/299 |
| 2014/0285178 A1 | 9/2014 | Williams | | |
| 2014/0355161 A1* | 12/2014 | Torres | ...................... | H02H 9/02 361/93.9 |
| 2015/0042292 A1 | 2/2015 | Mao et al. | | |
| 2015/0200593 A1* | 7/2015 | Stoichita | ............... | H02M 3/158 323/271 |

OTHER PUBLICATIONS

German Office Action, English language Translation, File No. 10 2015 219 307.1, Applicant: Dialog Semiconductor (UK) Limited, dated Jan. 3, 2018, 9 pages.

German Office Action, File No. 10 2015 219 307.1, Applicant: Dialog Semiconductor (UK) Limited, dated Jan. 3, 2018, 6 pages.

* cited by examiner

FIG. 5 ic response. They may be operated in one or more modes, notably in a PFM (pulse frequency modulation) or in a PWM (pulse width modulation) mode to convert electrical power and provide a regulated output voltage.

SWITCHED-MODE POWER CONVERTER WITH A CURRENT LIMIT CIRCUIT

TECHNICAL FIELD

The present document relates to switched-mode power converters. In particular, the present document relates to a switched-mode power converter with a current limit circuit for limiting the input current into the power converter and/or for limiting the output current at the output of the power converter.

BACKGROUND

Switched-mode power converters are widely used due to their high power conversion efficiency and fast dynamic response. They may be operated in one or more modes, notably in a PFM (pulse frequency modulation) or in a PWM (pulse width modulation) mode to convert electrical power and provide a regulated output voltage.

Switched-mode power converters are applied e.g. in battery charger systems. Such battery charger systems often have to limit the current at their input or at their output. At the input side, the input current has to be limited to not overload the source for charging (e.g. a wall adapter or a USB compliant source). At the output side, on the other hand, the output current should be limited to not damage the battery. To achieve this objective, a current regulation loop is needed for sensing and limiting the input current or output current.

Current regulation loops described in the state of the art are inactive until a current overload situation is detected. A current overload situation may occur in response to an initial event, such as e.g. a load change. In response to the initial event, the input or output current of a switched-mode power converter may quickly rise above a predetermined current threshold. The current regulation loop becomes active and reduces the respective current towards the predetermined current threshold.

The described unwanted rise of either the input current or the output current above the predetermined current threshold is also known as current over-shoot. At this, a current over-shoot may be characterized in terms of (a) a maximum current value measured after occurrence of the initial event or in terms of (b) a recovery time defined as the time the respective current exceeds an acceptable current value. The acceptable current value may be greater or equal to the predetermined current threshold.

SUMMARY

The present document addresses the above mentioned technical problems. In particular, the above problems are solved by the claimed subject-matter according to the independent claims. The present invention addresses a switched-mode power converter with a current limit circuit. At this, the current limit circuit is configured to limit the input current into the switched-mode power converter and/or the output current at the output of the switched-mode power converter. In any case, the switched-mode power converter comprises a main feedback loop for controlling the output voltage of the switched-mode power converter. A first voltage comparison unit within this main feedback loop is configured to compare a voltage indicative of the output voltage with a reference voltage and to output an error voltage based on the comparison result.

The switched-mode power converter may be e.g. a buck converter, a boost converter or a buck-boost converter. Moreover, the switched-mode power converter may work in PWM or PFM mode.

The voltage comparison unit may be e.g. an operational amplifier configured to act as an error amplifier. For comparing the voltage indicative of the output voltage with the reference voltage, one input of the voltage comparison unit may be directly coupled to the output voltage at the output of the switched-mode power converter. Alternatively, the latter input of the voltage comparison unit may be indirectly coupled to the output voltage via a voltage divider or some other intermediate circuitry as long as the voltage at the input of the voltage comparison unit is indicative of the output voltage (e.g. proportional).

For limiting an input current into the switched-mode power converter, the switched-mode power converter comprises a first current control unit with a first current comparison unit and a first connection unit. On the one hand, the first current comparison unit is configured to compare the input current with a first current threshold and to output a first intermediate voltage based on the comparison. On the other hand, the first connection unit is connected to the output of the first current comparison unit and configured to connect, in case the input current exceeds the first current threshold, the output of the first current comparison unit to the output of the first voltage comparison unit in order to impact the error voltage provided by the first voltage comparison unit. The first current control unit is configured to set or adjust the first intermediate voltage such that an overshoot of the input current is reduced or even minimized.

As already mentioned, current over-shoot may be triggered by a load change when the power converter is connected e.g. to a battery or a wall socket. Such a current over-shoot may be characterized in terms of (a) a maximum current value measured after occurrence of the load change or in terms of (b) a recovery time defined as the time the respective current exceeds an acceptable current value. The acceptable current value may be greater or equal to the predetermined current threshold. By adjusting the first intermediate voltage, the first current control unit is minimizing at least one of the above criteria (a) and (b).

The first current comparison unit may be further configured to sense the input current of the switched-mode power converter and generate a signal that is indicative of the input current.

In general, the first current comparison unit and the first connection unit form part of current limit loop. The current limit loop starts with the first current comparison unit sensing and/or comparing the input current, continues over the first connection unit and finally uses the last part of the main feedback loop for controlling the output voltage to limit the input current when necessary. At this, the current limit loop is said to be inactive in case the input current does not exceed the first current threshold. The other way round, the current limit loop said to be active in case the input current exceeds the first current threshold.

By connecting the output of the first current comparison unit to the output of the first voltage comparison unit, the error voltage is coupled to the first intermediate voltage. Thus, the first connection unit makes it possible to isolate the error voltage from the first intermediate voltage in times when the current limit loop is inactive. During these times, the switched-mode power converter is controlling its output voltage with the help of the main feedback loop. When, however, a high input current is detected, the current limit loop becomes active and the first current control unit adjusts the error voltage by adjusting the first intermediate voltage and, hence, intervenes in the main feedback loop for limiting the input current. Thus, the first current control unit makes it possible to overrule the regulation of the output voltage of the switched-mode power converter for the sake of limiting the input current in case the input current exceeds the first current threshold.

Additionally or alternatively, for limiting the output current at the output of the switched-mode power converter, the switched-mode power converter may comprise a second current control unit with a second current comparison unit and a second connection unit. On the one hand, the second current comparison unit is configured to compare the output current with a second current threshold and to output a second intermediate voltage based on the comparison. On the other hand, the second connection unit is connected to the output of the second current comparison unit and configured to connect, in case the output current exceeds the second current threshold, the output of the second current comparison unit to the output of the first voltage comparison unit. The second current control unit is configured to adjust the second intermediate voltage such that an over-shoot of the output current is minimized.

The second current comparison unit may be further configured to sense the output current of the switched-mode power converter and generate a signal that is indicative of the output current.

In case the switched-mode power converter comprises both a first and second current control circuit for limiting both the input and output current, both the first and the second connection units are configured to couple the respective first and second intermediate voltages to the output of the first voltage comparison unit within the main feedback loop. Consequently, whenever either the first current threshold or the second current threshold are exceeded, the respective first or second intermediate voltage is adjusted in order to limit the current through the switched-mode power converter.

The considerations in the following paragraphs apply for current limit circuits which limit the input current as well as the output current. To simplify the discussion, the following description will not differentiate between respective "first" and "second" units, thresholds and voltages. It will be readily apparent to the reader that whenever particular features of "the current control unit" are described, the particular features may be implemented in "first control units" concerning the input current as well as "second control units" concerning the output current.

The connection unit may be configured to connect the output of the current comparison unit to the output of the first voltage comparison unit in case the intermediate voltage is smaller than the error voltage and to isolate the output of the current comparison unit from the output of the first voltage comparison unit in case the intermediate voltage is larger than the error voltage. Thus, the connection unit may be implemented by a simple electronic circuit which may for example be a buffer or solely comprise a single transistor as switching element. In the following description, the terminal which is located at the output of the connection unit and at the output of the first voltage comparison unit will be denoted as control terminal, wherein the electric potential at the control terminal corresponds to the error voltage. In other words, the connection unit makes it possible that the intermediate voltage, which is indicative of the input/output current, at the output of the current comparison unit influences the error voltage at the control terminal of the main feedback loop.

The current comparison unit may comprise a voltage clamp whose output is connected to the output of the current comparison unit and the current comparison unit is configured to adjust the intermediate voltage based on a clamp reference voltage at an input of the voltage clamp. Using a voltage clamp shows the advantage that the intermediate voltage may be set or stabilized at a voltage corresponding to the clamp reference voltage while the current limit loop is not active.

Moreover, the current control unit may be configured to adjust the clamp reference voltage slightly above an expected maximum value of the error voltage. Hence, the clamp reference voltage and the intermediate voltage are as close as possible at the value of the error voltage before the current limit loop becomes active. In this way, the time delay unit the error voltage at the control terminal is influenced by the current limit loop is reduced.

Further, the current control unit may be configured to dynamically adjust the clamp reference voltage based on a duty-cycle of the switched-mode power converter and/or the current threshold. By choosing an appropriate clamp reference voltage, the time delay until the current limit loop becomes active may be reduced, wherein the time delay may be defined e.g. as the time from the moment in which the input/output current exceeds the respective threshold value until the moment in which the connection unit connects the output of the first voltage comparison unit to the output of the first voltage comparison unit. In general, the clamp reference voltage should be chosen such that the intermediate voltage is (a) high enough to not limit the error voltage—and consequently the input/output current—when the current limit loop is not active and (b) low enough to reduce the time delay.

The current comparison unit may comprise a voltage controlled current source and a capacitance, and the voltage of the capacitance is indicative of the intermediate voltage at the output of the current comparison unit. In this scenario, the voltage controlled current source may be configured to charge or discharge, at its output, the capacitance in a controlled way in case the input current or the output current exceeds the current threshold. By using a voltage controlled current source and a capacitance, the current limit loop is implemented as integrator type circuit.

Furthermore, the current comparison unit may comprise a reference transistor whose source is connected to a first input of the voltage controlled current source. The current comparison unit may comprise a reference current source connected to the first input of the voltage controlled current source and configured to provide a reference current corresponding to the current threshold to the reference transistor. The current comparison unit may comprise a sense transistor whose source is connected to a second input of the voltage controlled current source. The input current into the switched-mode power converter or the output current at the output of the switched-mode power converter is flowing through the sense transistor, and the gates of the sense and the reference transistor are connected to each other and the drains of the sense and the reference transistor are connected to each other.

Optionally, a switching element of the switched-mode power converter may be used as sense transistor. In this way, the number of required transistors may be reduced.

The switched-mode power converter may comprise a second voltage comparison unit configured to compare the error voltage at the output of the first voltage comparison unit with a ramp voltage and to output a control signal for controlling switching elements of the switched-mode power converter. For this purpose, a first input of the second voltage comparison unit may be connected with a ramp voltage generator, while a second input of the second voltage comparison unit may be connected with the control terminal, which is in turn connected to the output of the first voltage comparison unit as well as the output of the connection unit. Therefore, the second input of the second voltage comparison unit may be connected via the connection unit with the output of the current comparison unit (at intermediate voltage) e.g. in case the intermediate voltage is lower than the error voltage. Alternatively or additionally, the second input of the second voltage comparison unit may be connected with the output of the first voltage comparison unit (at the error voltage), e.g. in case the intermediate voltage is higher than the error voltage.

According to a further aspect, a method for limiting an input current into a switched-mode power converter is described. The method comprises a step of comparing a voltage indicative of the output voltage of the switched-mode power converter with a reference voltage in a main feedback loop for controlling the output voltage of the switched-mode power converter. Based on said comparing step, an error voltage at an output of a first voltage comparison unit is determined. Further, the method includes a step of comparing the input current into the switched-mode power converter with a current threshold. Based on the latter comparing step, an intermediate voltage is determined at an output of a current comparison unit. In case the input current exceeds the current threshold, the output of the current comparison unit is connected to the output of the first voltage comparison unit to apply the intermediate voltage to the error voltage. The intermediate voltage is adjusted such that an over-shoot of the input current is minimized.

According to a further aspect, a method for limiting an output current at the output of a switched-mode power converter is described. The method comprises the step of comparing a voltage indicative of the output voltage of the switched-mode power converter with a reference voltage in a main feedback loop for controlling the output voltage of the switched-mode power converter. Based on said comparing step, an error voltage at an output of a first voltage comparison unit is determined. Further, the method includes a step of comparing the output current at the output of the switched-mode power converter with a current threshold. Based on the latter comparing step, an intermediate voltage at an output of a current comparison unit is determined. In case the output current exceeds the current threshold, the output of the current comparison unit is connected to the output of the first voltage comparison unit for applying the intermediate voltage to the error voltage. The intermediate voltage is adjusted such that an over-shoot of the output current is minimized.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the terms "couple", "coupled", "connect", and "connected" refer to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
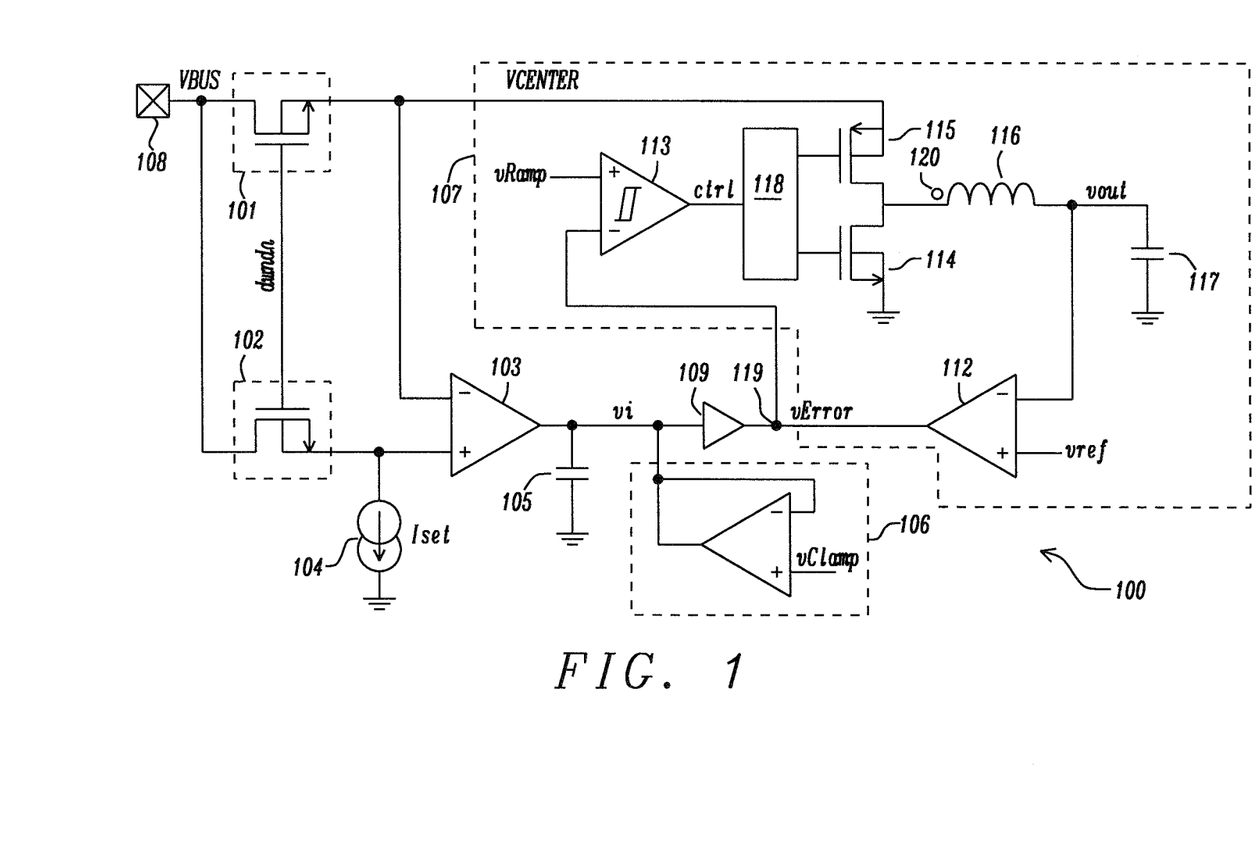
FIG. 1 shows a circuit diagram of an example switched-mode power converter with a current limit circuit for limiting the input current.

As outlined above, the present document relates to a switched-mode power converter with a current limit circuit. FIG. 1 schematically illustrates a circuit diagram of an exemplary embodiment of a switched-mode power converter 100 with a current limit circuit for limiting the input current.

In FIG. 1, reference sign 107 denotes a standard power converter which is well known to those skilled in the art. For this reason, only a short description of the components and functionality of the standard power converter 107 will be given in the following. The illustrated standard power converter 107 is a buck converter. Nevertheless, those skilled in the art will realize that alternative implementations of a switched-mode power converter are possible without deviating from the spirit of the invention.

The standard power converter 107 comprises an inductor 116 (e.g. a coil unit) and one or more switching elements 114, 115 (e.g. MOSFETs) for energizing and de-energizing the inductor 116. More specifically, the standard power converter 107 may comprise a high side switching element 115 and a low side switching element 114. The one or more switching elements 114, 115 are connected in series between a terminal to which the input voltage VCENTER of the standard power converter 107 is supplied, and ground. A drive circuit 118 controls the switching operation of the one or more switching elements 114, 115 in accordance with a control signal ctrl.

The inductor 116 is connected to an intermediate node 120 between the high-side switching element 115 arranged closest to the terminal to which the input voltage VCENTER is supplied, and the low-side switching element 114 arranged closest to ground. Moreover, the inductor 116 is provided at an output side of the standard power converter 107 and is part of an output filter. The output filter further comprises an output capacitor 117 which is arranged between the inductor 116 and ground. The output voltage at the output of the standard power converter 107 is denoted as vout. Moreover, a load to the standard power converter 107 may be connected in parallel to the output capacitor 117 at the output voltage vout.

A main feedback loop within the standard power converter 107 generates the control signal ctrl on the basis of a voltage indicative of the actual output voltage vout of the standard power converter 107. In the example circuit schematically illustrated in FIG. 1, the control signal ctrl is derived from the output voltage vout by tapping vout at an output node between the inductor 116 and the output capacitor 117.

The main feedback loop comprises at least a first voltage comparison unit 112 and a second voltage comparison unit 113. The first voltage comparison unit 112 may be e.g. an error amplifier which is configured to compare the output voltage vout with are reference voltage vref and to output an error voltage vError based on the comparison. In the displayed example, the error voltage vError is determined by the difference between the reference voltage vref and the output voltage vout. The reference voltage vref is chosen in accordance with a desired output voltage vout.

In a next step, the error voltage vError is fed to the second voltage comparison unit 113. The voltage comparison unit 113 may be e.g. a Schmitt-trigger which is configured to compare the error voltage vError at the output of the first voltage comparison unit 112 with a ramp voltage vRamp and to output the control signal ctrl for controlling the drive circuit 118. In other words, the second voltage comparison unit 113 generates the control signal ctrl for controlling the switching elements 114, 115 of the standard power converter 107.

The ramp voltage vRamp is a voltage that repeatedly rises in accordance with a positive ramp slope until a given upper ramp voltage level is reached and subsequently falls in accordance with a negative ramp slope until a given lower ramp voltage level is reached. The ramp voltage vRamp is generated by a suitable ramp generator (not shown).

In summary, the main feedback loop of the standard power converter 107 serves the purpose of regulating the output voltage vout in accordance with the chosen reference voltage vref at one input of the first voltage comparison unit 112.

Still in FIG. 1, connection unit 109 is depicted. Moreover, a current comparison unit is not explicitly depicted as a single unit with a dedicated reference sign. Rather, the current comparison unit comprises all illustrated circuit elements with the exception of the connection unit 109, a power source 108 and the elements which are part of the standard power converter 107. To be more specific, the current comparison unit comprises a sense transistor 101, a reference transistor 102, a current source 104, an operational transconductance amplifier OTA 103, an integrating capacitor 105 and a voltage clamp 106.

The sense transistor 101 and the reference transistor 102 may be metal oxide semiconductor (MOS) transistors, e.g. MOS field effect transistors (FET). In the illustrated example, the sense transistor 101 and the reference transistor 102 are n-type MOS transistors. The gates of the sense transistor 101 and the reference transistor 102 are coupled together. The voltage at both gates is denoted vpump in FIG. 1. Moreover, the drains of the sense transistor 101 and the reference transistor 102 are coupled to the input of the switched-mode power converter 100. At said input, the input voltage VBUS is provided by the power source 108. Hence, the sense transistor 101 and the reference transistor 102 form parallel branches with regard to an input current flowing from the power source 108 into the switched-mode power converter 100.

Both the sense transistor 101 and the reference transistor 102 are operated in their linear mode, where the transistors may be regarded as controlled resistors with respective resistances. The latter resistance will be called on-resistance in the following description. The on-resistance of the sense transistor 101 should typically be chosen very low to minimize losses. Moreover, the sense transistor 101 has no influence to adjust the input current at the input of the switched-mode power converter 100.

The ratio of the on-resistances of the sense transistor 101 and the reference transistor 102 is chosen such that a current through the sense transistor 101 is n times larger than the current through the reference transistor 102, wherein the factor n may be e.g. 1000. For instance, the ratio of the on-resistances may be adjusted by appropriately dimensioning of the sizes (i.e. the width/length) of both transistors 101, 102. Consequently, both transistors 101, 102 are operated in the same operating point and the ratio of the currents flowing through both transistors is known in advance.

The source of the reference transistor 102 is coupled to a first input of the OTA 103. The operational transconductance amplifier OTA 103 is an amplifier whose differential input voltage produces a controlled output current. Thus, OTA 103 can be classified as a voltage controlled current source (VCCS). Similar to a standard operational amplifier, the OTA 103 has a high impedance differential input stage.

As will be explained in the following paragraphs, the OTA 103 is configured to charge or discharge, at its output, the integrating capacitor 105 in case the input current to the switched-mode power converter 100 exceeds the current threshold. Moreover, the OTA 103 and the regulation loop keeps the operating point for the reference transistor 102 and the sense transistor 101 equal with the difference of a ratio between these two.

Moreover, the source of the reference transistor 102 is also coupled to a reference current source 104. The reference current source 104 is configured to provide a reference current Iset to the reference transistor 102. Due to the high impedance input of the OTA 103, the reference current Iset is forced to flow through the reference transistor 102. At this, the reference current Iset is proportional to the desired current threshold. Therefore, if it is desired to limit the input current into the switched-mode power converter 100 flowing through the sense transistor 101 to a particular current threshold (i.e. an upper bound), the reference current Iset should be adjusted to be equal to the current threshold divided by the factor n.

On the other hand, the source of the sense transistor 101 is coupled to a second input of the OTA 103 and to the standard power converter's 107 input terminal at the input voltage VCENTER.

As already mentioned, one terminal of the integrating capacitor 105 is coupled to the output of the OTA 103. The other terminal is connected to ground. The voltage over the integrating capacitor 105 is denoted as intermediate voltage vi.

In addition, the output of the OTA 103 is coupled to the connection unit 109. Put in a different way, the connection unit 109 is arranged between a terminal with the intermediate voltage vi provided by the current comparison unit and a control terminal 119 at the error voltage vError within the main feedback loop of the standard power converter 107.

The connection unit 109 may be implemented by a simple electronic circuit which may for example be a buffer or solely comprise a single transistor as switching element. In the illustrated example, the functionality of the connection unit 109 can be described as follows: If the error voltage vError is smaller than the intermediate voltage vi, the connection unit 109 isolates the two mentioned terminals of the current comparison unit and the standard power converter 107 from each other. In case the error voltage vError is larger than the intermediate voltage vi, the connection unit 109 establishes an electrical connection between the two terminals. As a result of this electrical connection, the error voltage vError is drawn to the intermediate voltage vi until vError equals vi.

If now the input current through the sense transistor 101 exceeds the current threshold, the OTA 103 translates the voltages at its inputs into a negative current with discharges the integrating capacitor 105 and, as a consequence, reduces the intermediate voltage vi. As soon as the intermediate voltage vi falls below the error voltage vError, the connection unit 109 establishes an electrical connection to control terminal 119 within the main feedback loop of the standard power converter 107 and the electrical potential of the control terminal 119 decreases. The reduction of the electrical potential of the control terminal 119 starts at a potential corresponding to the error voltage vError which is provided by the first voltage comparison unit and ends at a potential corresponding to the intermediate voltage vi of the integrating capacitor 105. Thus, the reduced error voltage vError will cause an adapted control signal ctrl and an adapted switching behavior of the switching elements 114, 115 and limits the current flowing through the switched-mode power converter 100.

When the input current is below the current threshold, the current limit loop formed by the current comparison unit and the connection unit 109 is not active, and the connection unit 109 isolates the error voltage vError from the intermediate voltage vi. In this situation, the intermediate voltage vi over the integrating capacitor 105 tends to saturate at the supply voltage (e.g. at the input voltage VBUS which is e.g. 2.5 V). Once the current limit loop is activated, the intermediate voltage vi has to settle to an operating point to close the loop. The resulting time delay will create a current-overshoot, i.e. input/output currents higher than the predetermined current threshold, until the current limit loop starts regulating and limiting the input current below the current threshold.

To stabilize the intermediate voltage vi at a fixed voltage, the voltage clamp 119 (also clamp or clamper) is used. The voltage clamp 119 is coupled to the output of the OTA 103. In the illustrated example the voltage clamp 119 is implemented using an operational amplifier with the inverting input coupled to its output. At the non-inverting input of the operational amplifier, the clamp voltage vClamp is supplied.

The voltage clamp 106 is not essential for the functionality of the current limit loop, but may be helpful for improving the performance and minimize an over-shoot of the input current. By adjusting the clamp voltage vClamp, the intermediate voltage vi may be reduced during times when the current limit loop is not active and the saturation of the intermediate voltage vi at the supply voltage VBUS may be prevented. In this way, the time delay until the current limit loop comes into regulation is reduced. However, the intermediate voltage vi should be high enough to not interfere with the main feedback loop and limit the input/output current during times when the current limit loop is not active. Thus, an optimized clamp voltage vClamp is set as a function of the duty cycle of the standard power converter 107 (i.e. the switching times of the switching elements 114, 115 controlled by the drive circuit 118) and the set value of the current threshold. In addition, parameters resulting from process variation may be taken into account.

For example, the clamp voltage vClamp may be adjusted to stabilize the intermediate voltage vi at a voltage slightly above a maximum value of the error voltage vError. Typical values for the maximum error voltage vError may be determined for the standard power converter and are e.g. at about 1.6V, and the dynamic adjustment of the intermediate voltage vi should be slightly above this value. In order to determine a maximum error voltage vError over time, a control circuitry (not shown) may record a history of maximum levels of the error voltage vError for dynamic adjustment of the clamp voltage vClamp.

The operating point for the output of the OTA 103 is relative to the error voltage vError and the ramp voltage vRamp of the main feedback loop within the standard power converter 107. For a practical solution this value can be split into a pedestal minimum value, a compensation ramp part which is duty cycle dependent, and a current dependent part of the high-side. In other words, this value can be calculated for a given current setting and duty cycle.

Since the pedestal voltage and the compensation ramp are trimmed during production (or is known from simulation), one can use this information in conjunction with the current limit setting to calculate this voltage. Typical values are about 100 mV.

The calculation of this value is strongly dependent on the implementation of the main feedback loop within the standard power converter 107 and has to be adjusted for each design. The granularity of the clamp voltage vClamp is the number of different current limit settings and the resolution of the duty cycle measurement. Of course, one can trade-off number of granularity versus time delay reduction optimization.

Figure 2:
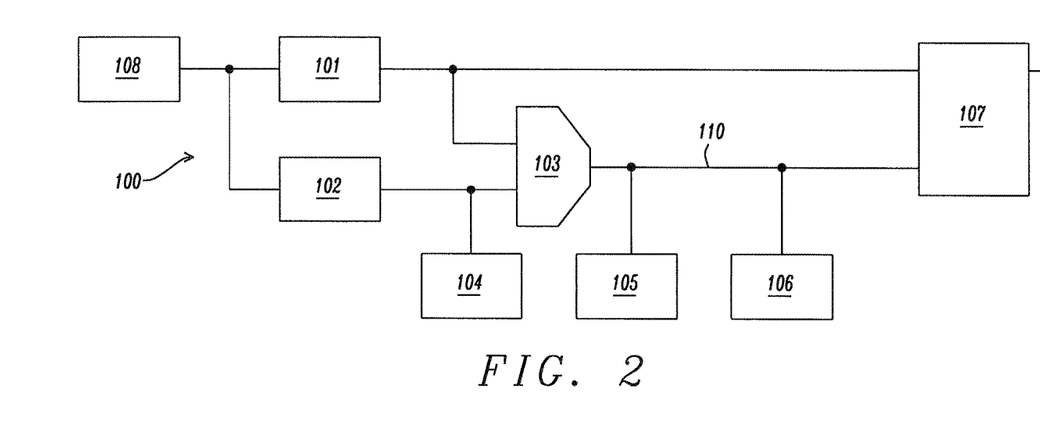
FIG. 2 shows a block diagram of an example switched-mode power converter with a current limit circuit for limiting the input current.

FIG. 2 shows a block diagram of the example switched-mode power converter 100 with a current limit circuit for limiting the input current. It should be noted that in the block diagram in FIG. 2 the same circuit components as in FIG. 1 are illustrated with the exception of the connection unit 109. Connection unit 109, which is not explicitly depicted in FIG. 2, is coupled between the output of the OTA 103 and a terminal at the error voltage vError within the main feedback loop of the standard power converter 107.

Figure 3:
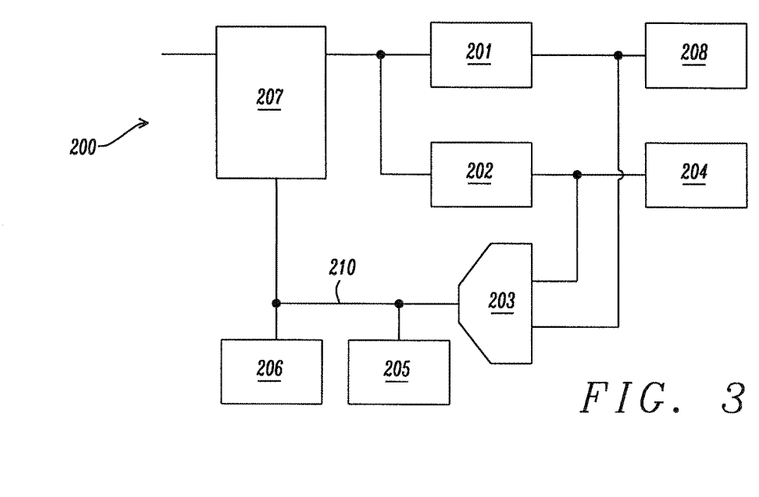
FIG. 3 shows a block diagram of an example switched-mode power converter with a current limit circuit for limiting the output current.

The principles discussed in the foregoing may be applied analogously to a switched-mode power converter 200 in FIG. 3 with a current limit circuit for limiting the output current. FIG. 3 shows a block diagram of an example of a switched-mode power converter 200 with a current limit circuit for limiting the output current. Specifically, FIG. 3 depicts a standard power converter 207, a sense transistor 201, a reference transistor 202, a load 208, a reference current source 204 and an OTA 203. Moreover, an integrating capacitor 205 and a voltage clamp 206 are coupled to the output of the OTA 203. As in FIG. 2, a connection unit 209 is not explicitly displayed in FIG. 3. Nevertheless, the connection unit 209 is coupled between the output of the OTA 203 and a terminal at the error voltage vError within the main feedback loop of the standard power converter 207.

Figure 4:
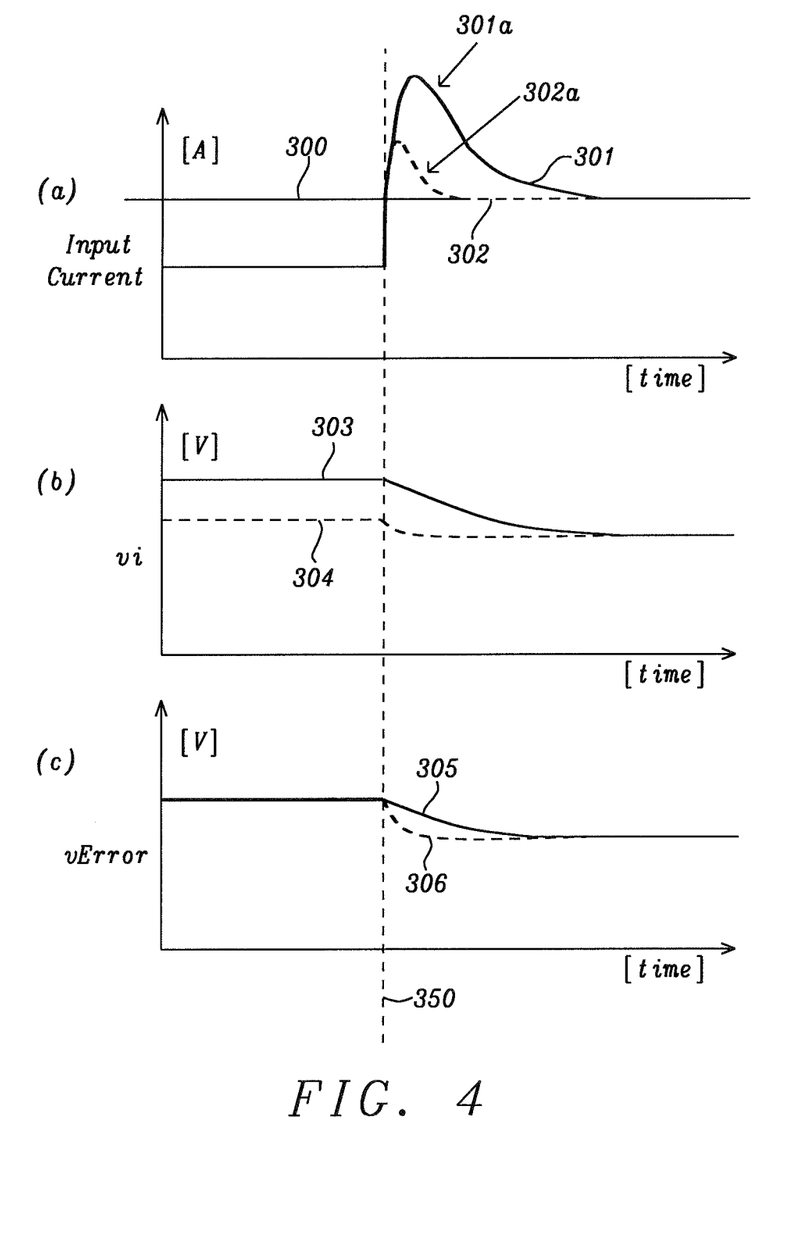
FIG. 4 shows two example diagrams illustrating currents and voltages in a current overload situation.

FIG. 4 shows three example diagrams a), b) and c) illustrating currents and voltages in a current overload situation. In particular, diagram a) illustrates the input current of a switched-mode power converter 100 over time. At time 350, a had step occurs that enforces the current limit to be active. The current threshold is denoted as 300. The solid line 301 shows the input current in case the intermediate voltage vi is not optimized. Shortly after occurrence of the load step 350, a significant current over-shoot 301a occurs. The dashed line 302 depicts the input current in case the intermediate voltage vi is optimized according to the teachings of this document. Obviously, the optimized intermediated voltage vi leads to significantly reduced current over-shoot 302a. Diagram b) illustrates the intermediate voltage vi in the same situation. The solid line 303 shows vi in the non-optimized case, whereas the dashed line 304 shows vi in the optimized case. On the other hand, diagram c) illustrates the error voltage vError in the same situation. The solid line 305 shows the error voltage vError in the non-optimized case, and the dashed line 306 shows the error voltage vError in the optimized case. As can be seen in diagram c), the error voltage vError is the same in the optimized case and the non-optimized case when the current limit loop is not active, i.e. before the load step 350 occurs.

Figure 5:
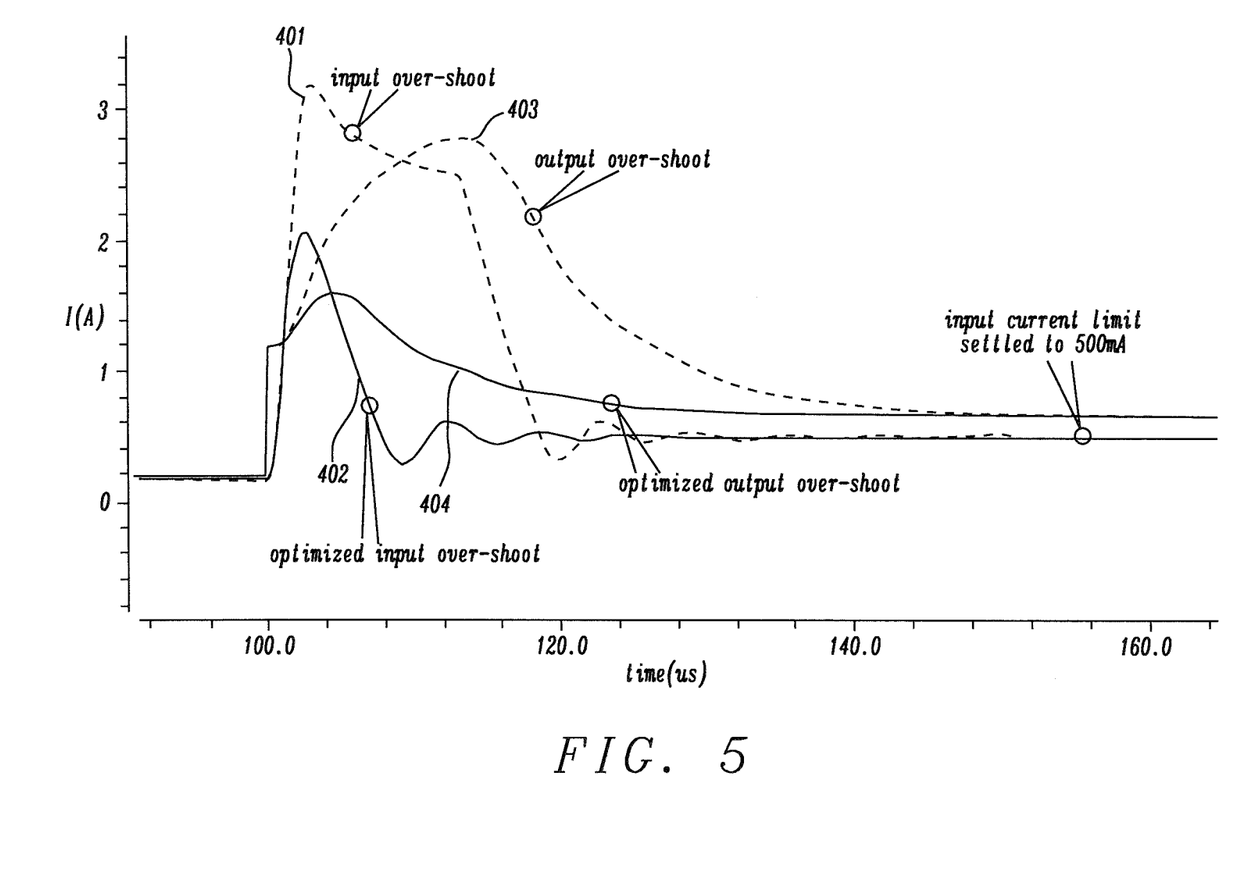
FIG. 5 shows simulations results of input/output currents in overload situations.

FIG. 5 shows simulations results of input and output currents in overload situations. Specifically, curve 401 shows the input current for the case that the intermediate voltage vi is not-optimized, and curve 402 shows the input current for the case that the intermediate voltage vi is optimized. Moreover, curve 403 shows the output current for the case that the intermediate voltage vi is not-optimized, and curve 404 shows the output current for the case that the intermediate voltage vi is optimized according to the teachings of the present invention. The simulation result clearly illustrates the reduced current over-shoots, both for the input current and for the output current of a switched-mode power converter.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A switched-mode power converter comprising
a feedback loop for controlling the output voltage of the switched-mode power converter;
a first voltage comparison unit within the feedback loop configured to compare a voltage indicative of the output voltage with a reference voltage and to output an error voltage based on the comparison;
a current control unit for limiting an input current into the switched-mode power converter, the current control unit comprising
a current comparison unit configured to compare the input current with a current threshold and to output an intermediate voltage based on the comparison, and
a connection unit connected to the output of the current comparison unit and configured to connect, in case the input current exceeds the current threshold, the output of the current comparison unit to the output of the first voltage comparison unit;
wherein the current comparison unit comprises a voltage clamp whose output is connected to the output of the current comparison unit and the current comparison unit is configured to adjust the immediate voltage based on a clamp reference voltage at an input of the voltage clamp, and wherein the current control unit is configured to set, by adjusting the clamp reference voltage, the intermediate voltage such that an over-shoot of the input current is reduced.

2. A switched-mode power converter comprising
a feedback loop for controlling the output voltage of the switched-mode power converter;
a first voltage comparison unit within the feedback loop configured to compare a voltage indicative of the output voltage with a reference voltage and to output an error voltage based on the comparison;
a current control unit for limiting an output current at the output of the switched-mode power converter, the current control unit comprising
a current comparison unit configured to compare the output current with a current threshold and to output an intermediate voltage based on the comparison, and
a connection unit connected to the output of the current comparison unit and configured to connect, in case the output current exceeds the current threshold, the output of the current comparison unit to the output of the first voltage comparison unit;
wherein the current comparison unit comprises a voltage clamp whose output is connected to the output of the current comparison unit and the current comparison unit is configured to adjust the intermediate voltage based on a clamp reference voltage at an input of the voltage clamp, and wherein the current control unit is configured to adjust, by adjusting the clamp reference voltage, the intermediate voltage such that an over-shoot of the output current is minimized.

3. The switched-mode power converter according to claim 1, wherein the connection unit is configured to connect the output of the current comparison unit to the output of the first voltage comparison unit in case the intermediate voltage is smaller than the error voltage and to isolate the output of the current comparison unit from the output of the first voltage comparison unit in case the intermediate voltage is larger than the error voltage.

4. The switched-mode power converter according to claim 1, wherein the current control unit is configured to adjust the clamp reference voltage slightly above a maximum value of the error voltage.

5. The switched-mode power converter according to claim 1, wherein
the current comparison unit comprises a voltage controlled current source and a capacitance, and the voltage of the capacitance is indicative of the intermediate voltage at the output of the current comparison unit; and
the voltage controlled current source is configured to charge or discharge, at its output, the capacitance in case the input current exceeds the current threshold.

6. The switched-mode power converter according to claim 5, the current comparison unit comprising
a reference transistor whose source is connected to a first input of the voltage controlled current source,
a reference current source connected to the first input of the voltage controlled current source and configured to provide a reference current corresponding to the current threshold to the reference transistor, and
a sense transistor whose source is connected to a second input of the voltage controlled current source,
wherein the input current into the switched-mode power converter is flowing through the sense transistor, the gates of the sense and the reference transistor are connected to each other and the drains of the sense and the reference transistor are connected to each other.

7. The switched-mode power converter according to claim 1, further comprising a second voltage comparison unit configured to compare the error voltage at the output of the first voltage comparison unit with a ramp voltage and to output a control signal for controlling switching elements of the switched-mode power converter.

8. A method for limiting an input current into a switched-mode power converter, the method comprising:
comparing a voltage indicative of the output voltage of the switched-mode power converter with a reference voltage in a feedback loop for controlling the output voltage of the switched-mode power converter;
determining, at an output of a first voltage comparison unit, an error voltage based on said comparing;
comparing an input current into the switched-mode power converter with a current threshold;
determining, at an output of a current comparison unit, an intermediate voltage based on said comparing the input current;
connecting, in case the input current exceeds the current threshold, the output of the current comparison unit to the output of the first voltage comparison unit to apply the intermediate voltage to the error voltage; and
wherein the current comparison unit comprises a voltage clamp whose output is connected to the output of the current comparison unit and the current comparison unit adjusts the intermediate voltage based on a clamp reference voltage at an input of the voltage clamp; and
wherein the intermediate voltage is adjusted, by adjusting the clamp reference voltage, such that an over-shoot of the input current is minimized.

9. A method for limiting an output current at the output of a switched-mode power converter, the method comprising:
comparing a voltage indicative of the output voltage of the switched-mode power converter with a reference voltage in a feedback loop for controlling the output voltage of the switched-mode power converter;
determining, at an output of a first voltage comparison unit, an error voltage based on said comparing;
comparing an output current at the output of the switched-mode power converter with a current threshold;
determining, at an output of a current comparison unit, an intermediate voltage based on said comparing the output current; and
connecting, in case the output current exceeds the current threshold, the output of the current comparison unit to the output of the first voltage comparison unit for applying the intermediate voltage to the error voltage;
wherein the current comparison unit comprises a voltage clamp whose output is connected to the output of the current comparison unit and the current comparison unit adjusts the intermediate voltage based on a clamp reference voltage at an input of the voltage clamp; and
wherein the intermediate voltage is adjusted, by adjusting the clamp reference voltage, such that an over-shoot of the input current is minimized.

10. The method according to claim 8, further comprising the steps of:
connecting the output of the current comparison unit to the output of the first voltage comparison unit in case the intermediate voltage is smaller than the error voltage, using the connection unit and
isolating the output of the current comparison unit from the output of the first voltage comparison unit in case the intermediate voltage is larger than the error voltage, using the connection unit.

11. The method according to claim 8, further comprising the step of:
adjusting the clamp reference voltage slightly above a maximum value of the error voltage, using the current control unit.

12. The method according to claim 8, wherein
the current comparison unit comprises a voltage controlled current source and a capacitance, and the voltage of the capacitance is indicative of the intermediate voltage at the output of the current comparison unit; and
the voltage controlled current source charges or discharges, at its output, the capacitance in case the input current exceeds the current threshold.

13. The method according to claim 12, wherein the current comparison unit comprises:
a reference transistor whose source is connected to a first input of the voltage controlled current source,
a reference current source connected to the first input of the voltage controlled current source and provides a reference current corresponding to the current threshold to the reference transistor, and
a sense transistor whose source is connected to a second input of the voltage controlled current source,
wherein the input current into the switched-mode power converter is flowing through the sense transistor, the gates of the sense and the reference transistor are connected to each other and the drains of the sense and the reference transistor are connected to each other.

14. The method according to claim 8, further comprising the steps of:
comparing the error voltage at the output of the first voltage comparison unit with a ramp voltage using a second voltage comparison unit and outputting a control signal for controlling switching elements of the switched-mode power converter using a second voltage comparison unit.

15. The switched-mode power converter according to claim 2, wherein
the current comparison unit comprises a voltage controlled current source and a capacitance, and the voltage of the capacitance is indicative of the intermediate voltage at the output of the current comparison unit; and
the voltage controlled current source is configured to charge or discharge, at its output, the capacitance in case the output current exceeds the current threshold.

16. The switched-mode power converter according to claim 15, the current comparison unit comprising
a reference transistor whose source is connected to a first input of the voltage controlled current source,
a reference current source connected to the first input of the voltage controlled current source and configured to provide a reference current corresponding to the current threshold to the reference transistor, and
a sense transistor whose source is connected to a second input of the voltage controlled current source,
wherein the output current at the output of the switched-mode power converter is flowing through the sense transistor, the gates of the sense and the reference transistor are connected to each other and the drains of the sense and the reference transistor are connected to each other.

17. The method according to claim 9, wherein
the current comparison unit comprises a voltage controlled current source and a capacitance, and the voltage of the capacitance is indicative of the intermediate voltage at the output of the current comparison unit; and
the voltage controlled current source is charges or discharges, at its output, the capacitance in case the output current exceeds the current threshold.

18. The method according to claim 17, wherein the current comparison unit is comprised of:
- a reference transistor whose source is connected to a first input of the voltage controlled current source,
- a reference current source connected to the first input of the voltage controlled current source and provides a reference current corresponding to the current threshold to the reference transistor, and
- a sense transistor whose source is connected to a second input of the voltage controlled current source,
- wherein the output current at the output of the switched-mode power converter is flowing through the sense transistor, the gates of the sense and the reference transistor are connected to each other and the drains of the sense and the reference transistor are connected to each other.

\* \* \* \* \*